(12) United States Patent
Loseille et al.

(10) Patent No.: US 12,597,205 B2
(45) Date of Patent: Apr. 7, 2026

(54) HYBRID GPU-CPU APPROACH FOR MESH GENERATION AND ADAPTIVE MESH REFINEMENT

(71) Applicant: Luminary Cloud, Inc., Redwood City, CA (US)

(72) Inventors: Adrien Loseille, Buc (FR); Michael Thomas Mara, La Jolla, CA (US); Dries Kimpe, Redwood City, CA (US); Juan José Alonso, Stanford, CA (US)

( * ) Notice: Subject to any disclaimer, the term of this patent is extended or adjusted under 35 U.S.C. 154(b) by 384 days.

(21) Appl. No.: 18/211,823

(22) Filed: Jun. 20, 2023

(65) Prior Publication Data

US 2023/0410428 A1     Dec. 21, 2023

(30) Foreign Application Priority Data

Jun. 21, 2022     (FR) ....................................... 2206120

(51) Int. Cl.
*G06T 17/20* (2006.01)
*G06F 9/50* (2006.01)
(52) U.S. Cl.
CPC ............ *G06T 17/20* (2013.01); *G06F 9/5077* (2013.01)
(58) Field of Classification Search
CPC .............................. G06T 17/20; G06F 9/5077
See application file for complete search history.

(56) References Cited

U.S. PATENT DOCUMENTS

2012/0233486 A1 *  9/2012  Phull ..................... G06F 9/5083
                                                 713/375
2021/0110089 A1 *  4/2021  Chen ...................... G06V 20/64

OTHER PUBLICATIONS

Hsi-Yu Schive et al: "GAMER: a GPU-Accelerated Adaptive Mesh Refinement Code for Astrophysics", arxiv.org, Jul. 20, 2009, 59 pages.
Hsi-Yu Schive et al: "GAMER-2: a GPU-accelerated adaptive mesh refinement code—accuracy, performance, and scalability", arxiv. org, Dec. 19, 2017, 29 pages.
(Continued)

*Primary Examiner* — Michelle Chin
(74) *Attorney, Agent, or Firm* — Cesari and McKenna, LLP

(57) ABSTRACT

A technique manages graphics processing units (GPUs), as well as associated algorithm advancements, to improve and effectively hide computational costs of adaptive mesh refinement (AMR). A cloud-based framework dynamically utilizes a distributed pool of the GPUs to parallelize computations of physical simulation software (solver) partitioned across multiple GPUs. A highly parallelized and distributed architecture of the framework provides a hybrid approach that operates partly on GPUs, e.g., to perform the solver computations, and partly on general-purpose processing units (CPUs) to accelerate portions of AMR and mesh processing of an AMR module. In an illustrative embodiment, the technique leverages the GPUs to perform as much of the AMR module processing (e.g., algorithms that rely on fixed topology) that can be naturally and efficiently implemented on the GPUs, while maintaining those portions of processing that do not naturally map onto the GPUs (e.g., algorithms with dynamic topology changes) on CPUs.

18 Claims, 7 Drawing Sheets

(56)     References Cited

OTHER PUBLICATIONS

Ji Hua et al: "A GPU-accelerated adaptive mesh refinement for immersed boundary methods", Computers and Fluids, vol. 118, Jun. 14, 2015, pp. 131-147, 17 pages.
Mohamed Wahib et al: "Data-centric GPU-based adaptive mesh refinement", Irregular Applications, Nov. 15, 2015 (Nov. 15, 2015), pp. 1-7, 7 pages.
PCT Notification of Transmittal of the International Search Report and the Written Opinion of the International Searching Authority, or the Declaration, International Searching Authority, International Application No. PCT/US2023/025731, mailed Sep. 15, 2023, 15 pages.
French Preliminary Search Report and Written Opinion on the Patentability of the Invention, French Application No. 2206120, mailed May 17, 2023, 10 pages.
Ji, Hua, Fue-Sang Lien, and Fan Zhang. "A GPU-accelerated adaptive mesh refinement for immersed boundary methods." Computers & Fluids 118 (2015): 131-147.
Schive, Hsi-Yu, Yu-Chih Tsai, and Tzihong Chiueh. "GAMER: A GPU-Accelerated Adaptive Mesh Refinement code for astrophysics." Astrophysics Source Code Library (2009), 59 pages.
Wahib, Mohamed, and Naoya Maruayama. "Data-centric GPU-based adaptive mesh refinement." Proceedings of the 5th Workshop on Irregular Applications: Architectures and Algorithms. 2015.
Schive, Hsi-Yu, et al. "GAMER-2: a GPU-accelerated adaptive mesh refinement code-accuracy, performance, and scalability." Monthly Notices of the Royal Astronomical Society 481.4 (2018): 4815-4840.

* cited by examiner

HYBRID GPU-CPU APPROACH FOR MESH GENERATION AND ADAPTIVE MESH REFINEMENT

CROSS-REFERENCE TO RELATED APPLICATIONS

The present application is a U.S. Patent Application that claims priority to French Patent Application No. 2206120 filed Jun. 21, 2022, by Adrien Loseille et al. for HYBRID GPU-CPU APPROACH FOR MESH GENERATION AND ADAPTIVE MESH REFINEMENT, which is hereby incorporated by reference.

BACKGROUND

Technical Field

The present disclosure relates to adaptive mesh refinement (AMR) and, more specifically, to improving computational costs of AMR in a virtualized computing environment.

Background Information

Many enterprises utilize virtual machines (VMs) running on compute nodes provided by a cloud-based, virtual data center (VDC) of a virtualized computing environment. The VDC may furnish resources, such as storage, memory, networking, and/or processor resources that are virtualized by virtualization software, e.g., a hypervisor, and accessible over a computer network, such as the Internet. Each VM may include a guest operating system and associated applications configured to utilize the virtualized resources of the VDC. An example of applications that may run in a VM and utilize the virtualized resources of the VDC is physical simulation software in the area of computer aided engineering (CAE).

Typically, the physical simulation software of legacy CAE software vendors is architected to run on on-premises computing clusters having general-purpose processing resources, such as central processing units (CPUs), connected through a high-performance network. However, recent developments by these legacy software vendors move select portions (e.g., linear solver code) of the physical simulation software for execution (running) on specialized accelerator processing resources, such as graphics processing units (GPUs), with the remaining portions of the physical simulation still being run on CPUs. Such limited apportionment is all that can be achieved because the legacy simulation software was originally developed to run on CPUs and the effort/cost to re-write (re-architect) the entire software for execution on GPUs is substantial, particularly considering the vectorization and parallelization of specific routines (simulation kernels) within the simulation software that benefit when run on the GPUs. The best ways to use the memory hierarchy on GPUs (and the available memory bandwidth) are also different than the ways in which CPU code utilizes the memory/memory bandwidth. Further, the limited apportionment results in substantial communication (e.g., data transfer) overhead between CPU and GPU, thereby impacting any performance improvements.

For example, iterative improvement of discrete meshes made up of a number of control volumes (CVs) used in finite element/finite volume (FE/FV) methods for physical simulation typically involves outputting (writing) the current mesh and solution (e.g., as a file) via the CPUs to a file system, suspending the physical simulation and then constructing a new, improved mesh. Thereafter, the new mesh is loaded with additional/refined CVs from the file system via the CPUs, the current solution is interpolated onto the new mesh, and the physical simulation is restarted. This results in significant idling of the processing resources and increasing overall time to complete the physical simulation. Such mesh refinement requires needless repeated transfer of large quantities of data via the CPU and filesystem, e.g., for each iteration of mesh improvement. In particular, refinement of the mesh typically requires sufficient progress of the simulation, e.g., waiting for an initial run of the mesh to execute, before refinement (changing) of the mesh is beneficial. Meanwhile, processing resources used for the physical simulation (e.g., GPUs) remain idle as the flow of the physical simulation software execution is interrupted pending mesh refinement, solution interpolation, and reload during which the processing is terminated and then restarted.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
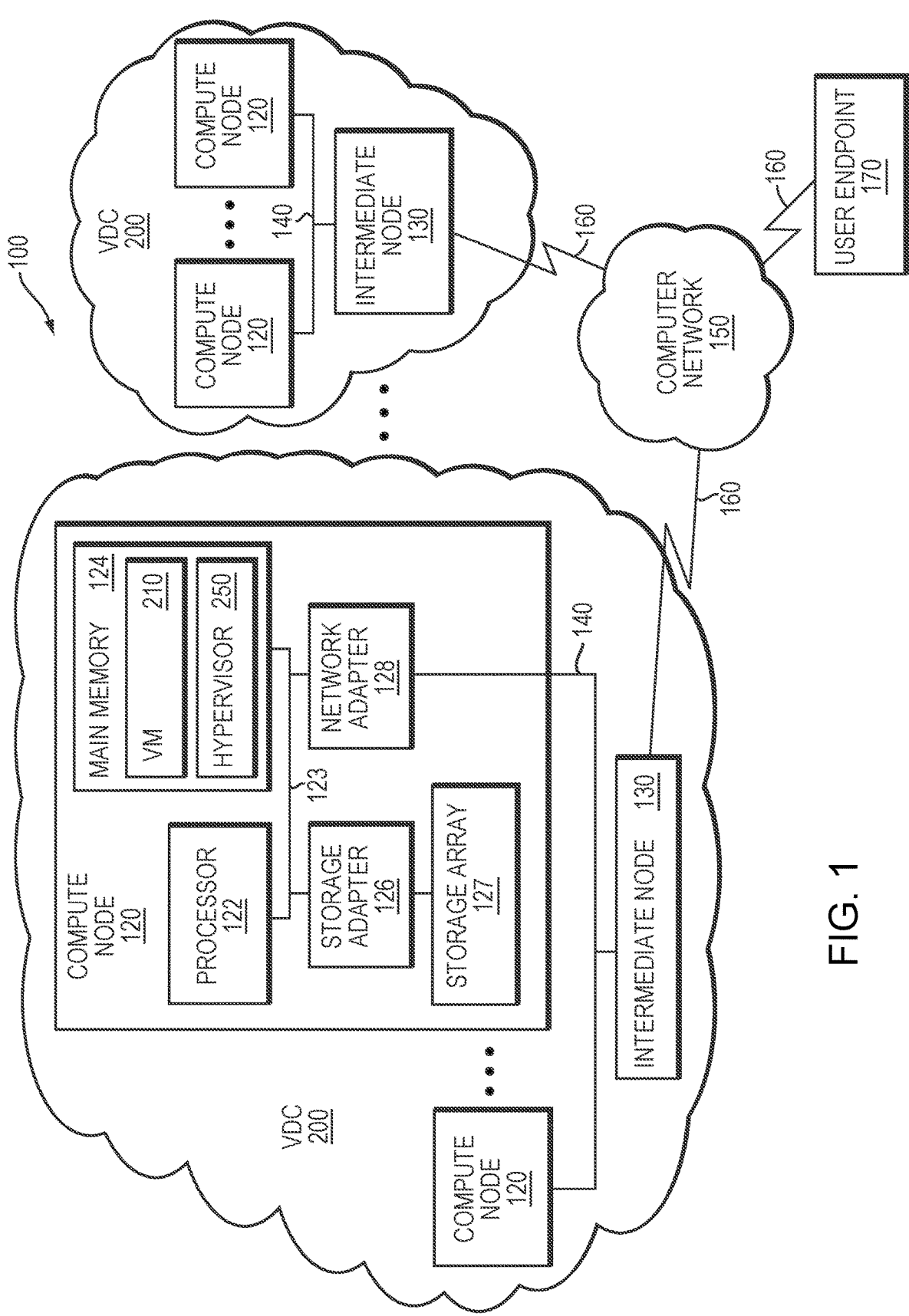
FIG. 1 is a schematic block diagram of a virtualized computing environment.

The embodiments described herein are directed to a technique that manages specialized processing resources, e.g., graphics processing units (GPUs), as well as associated algorithm advancements to improve (i.e., reduce) and effectively mask (hide) computational costs of adaptive mesh refinement (AMR) from execution of a physical simulation solver on the GPUs. To that end, the technique includes a cloud-based framework configured to dynamically utilize a distributed pool of the GPUs to parallelize processing (e.g., computations) of physical simulation software (e.g., computational fluid dynamics solver code or, more generally, physics solver code as well as AMR/meshing) partitioned across multiple GPUs. The technique leverages a highly parallelized and distributed architecture of the framework to provide a hybrid approach that operates partly on GPUs, e.g., to perform the physics solver code computations, and partly on general-purpose processing units (CPUs) to accelerate portions of AMR and mesh processing, e.g., of an AMR module. However, in an illustrative embodiment, the technique further leverages the GPUs to perform as much of the AMR module processing (e.g., algorithms that rely on fixed topology) that can be naturally and efficiently implemented on the GPUs, while maintaining those portions of processing that do not naturally map onto GPUs (e.g., algorithms with dynamic topology changes) on CPUs. AMR module processing that may be performed on GPUs includes, e.g., error estimates, metric and mesh smoothing, solution interpolation, and even portions of actual mesh adaptation. The technique thus improves AMR processing to enable dynamic (on-the-fly) mesh adaptation and refinement asynchronously as the physics solver code executes by fully and tightly integrating the CPU and GPU resources with the AMR module and physics solver code execution, while also orchestrating data transfers to reduce costs of AMR processing.

In an embodiment, execution of the AMR module is configured to lag execution of the physics solver code so that a new adapted mesh is generated (at least partially) on the CPUs while the computation in an old, previous mesh continues to run on the GPUs. That is, the solver continues to use GPU resources to provide numerical predictions of higher accuracy. Note that the continued use of GPUs is not restricted to performing additional iterations to increase convergence, but rather also encompasses resolution of any enhanced equations on the mesh to provide sensitivity of the numerical solution with respect to the current mesh. When the new mesh is ready, the latest numerical solution on the GPUs is interpolated onto the new mesh and the computation proceeds on the GPUs. The tight integration (synchronization) of resources obviates interruption of the physics solver code execution and allows tasks of the AMR module to proceed simultaneously. That is, once the GPU-CPU combination determines an error estimate and generates a refined mesh that is transferred to the GPUs, the physics solver code continues executing on that refined mesh while the AMR module awaits the next error estimate to generate a new refined mesh. In this manner, mesh refinement may be performed (largely) concurrently with solver execution. Execution of the physics solver code on GPUs then proceeds from the new (most recent) solution interpolated onto the new (refined/adapted) mesh asynchronously and fully integrated with the AMR module execution on CPUs to increase utilization of processing resources and, thus, effectively decrease an overall cost of simulation as well as the total time of the simulation. Notably, the hybrid approach of the technique enables adaptive refinement of mesh generation on CPUs while the physics solver code executes on GPUs.

In an embodiment, the technique is configured to allocate GPU and CPU resources commensurate with the physical simulation computations expected for various stages of the AMR processing. For example, it is cost effective to allocate only those resources needed at an initial stage (start) of a simulation, which may be a small subset of the entire amount of resources needed at the end (last stage) of the simulation. Accordingly, the technique includes use of a predictive scheduler configured to locate GPUs available in the distributed pool before they are needed, but within an expected window of time, measure the distances (i.e., latency) of the resources (e.g., on which the software executes) relative to each other, dynamically access and utilize available resources for AMR task execution (e.g., based on the measured distances) as the mesh adapts (e.g., grows) during the simulation, and then promptly release the GPUs upon completion of the simulation. Error estimates determined during AMR processing can be used to ascertain a size of the mesh (e.g., a number of CVs) needed for the various stages. In addition, the technique cooperates with the predictive scheduler to determine the number of GPUs currently allocated to the simulation and, if needed, the number of GPUs that may be dynamically acquired from other simulations that may be completing (and thus will relinquish those resources). That is, the predictive scheduler pools GPU resources globally across different simulations to maximize total utilization.

In an embodiment, the technique also provides a level of optimization in data transfer efficiency between the GPU and CPU resources through the use of adaptively changing data structures. During physics solver code execution, data contents of the data structures are organized in GPU memory in a format that enables non-intrusive CPU access to portions of the contents used for dynamic mesh adaptation in a safe manner and without impeding physics solver code execution on the GPUs. Such non-intrusive access reduces the number of copies of data stored in CPU memory, while advantageously providing a substantial performance improvement by minimizing movement of data between the GPU and CPU resources.

DESCRIPTION

FIG. 1 is a schematic block diagram of a virtualized computing environment 100 that may be advantageously used with a cloud-based framework disclosed herein. The virtualized computing environment includes one or more virtual data centers (VDCs 200) configured to provide virtualization that transforms physical hardware of the environment into virtual resources, as well as cloud computing that enables on-demand access to the virtualized resources, e.g., over a computer network. In an illustrative embodiment, the cloud-based framework extends the virtualization and cloud-computing capabilities of the VDCs 200 to provide improved execution of workloads, such as computer aided engineering (CAE) physical simulation software (e.g., physics solver code), as a cloud-based service offering, such as Software as a Service (SaaS), to users in a highly available, reliable, and cost-effective manner. However, it will be understood by persons of skill in the art that the technique described herein for managing specialized processing resources and associated algorithm advancements to improve and mask computational costs of AMR may also apply to a traditional data center (e.g., high performance computing cluster or any batch submission system) in a non-virtualized, non-cloud environment.

In an embodiment, the virtualized computing environment 100 includes one or more compute nodes 120 and intermediate nodes 130 illustratively embodied as one or more VDCs 200 interconnected by a computer network 150. The VDCs 200 may be cloud service providers (CSPs) deployed as private clouds or public clouds, such as deployments from Amazon Web Services (AWS), Google Compute Engine (GCE) of the Google Compute Project (GCP) ecosystem, Microsoft Azure, or VMWare. Each VDC 200 may be configured to provide virtualized resources, such as virtual storage, networking, memory, and/or processor resources that are accessible over the computer network 150, such as the Internet, to users at one or more user endpoints 170. Each compute node 120 is illustratively embodied as a computer system having one or more processors 122, a main memory 124, one or more storage adapters 126, and one or more network adapters 128 coupled by a network segment 123, such as a system interconnect. The storage adapter 126 may be configured to access information stored on magnetic/solid state storage devices, e.g., hard disk drives (HDDs), solid state drives (SDDs) or other similar media, of storage array 127. To that end, the storage adapter 126 may include input/output (I/O) interface circuitry that couples to the storage devices over an I/O interconnect arrangement, such as a conventional peripheral component interconnect (PCI), serial ATA (SATA), or non-volatile memory express (NVMe) topology.

The network adapter 128 connects the compute node 120 to other compute nodes 120 of the VDC 200 over local network segments 140 illustratively embodied as shared local area networks (LANs) or virtual LANs (VLANs). The network adapter 128 may thus be embodied as a network interface card (NIC) having the mechanical, electrical and signaling circuitry needed to connect the compute node 120 to the local network segments 140. The intermediate node 130 may be embodied as a network switch, router, or virtual private network (VPN) gateway that interconnects the LAN/VLAN local segments with remote network segments 160 illustratively embodied as point-to-point links, wide area networks (WANs), and/or VPNs implemented over a public network (such as the Internet). The VDC may utilize many different, heterogeneous network segments 123, 140, 160 for intra-node, inter-node, and inter-VDC communication, respectively, wherein the heterogeneous networks are diverse in characteristics such as bandwidth and latency. Communication over the network segments 140, 160 may be affected by exchanging discrete frames or packets of data according to pre-defined protocols, such as the Transmission Control Protocol/Internet Protocol (TCP/IP) and the OpenID Connect (OIDC) protocol, although other protocols, such as the User Datagram Protocol (UDP), the NVIDIA Collective Communications Library (NCCL), or the HyperText Transfer Protocol Secure (HTTPS) may also be advantageously employed.

The main memory 124 includes a plurality of memory locations addressable by the processor 122 and/or adapters for storing software code (e.g., processes and/or services) and data structures associated with the embodiments described herein. The processor and adapters may, in turn, include processing elements and/or circuitry configured to execute the software code, such as a virtual machine (VM) 210 and a hypervisor 250, and manipulate the data structures. The processors 122 may include general-purpose hardware processor resources, such as central processing units (CPUs) as well as specialized hardware accelerator resources, such as tensor processing units (TPUs) or, in an illustrative embodiment, graphics processing units (GPUs).

It will be apparent to those skilled in the art that other types of processing elements and memory, including various computer-readable media, may be used to store and execute program instructions pertaining to the embodiments described herein. Also, while the embodiments herein are described in terms of software code, processes, and computer, e.g., application, programs stored in memory, alternative embodiments also include the code, processes and programs being embodied as logic, components, and/or modules consisting of hardware, software, firmware, or combinations thereof.

Figure 2:
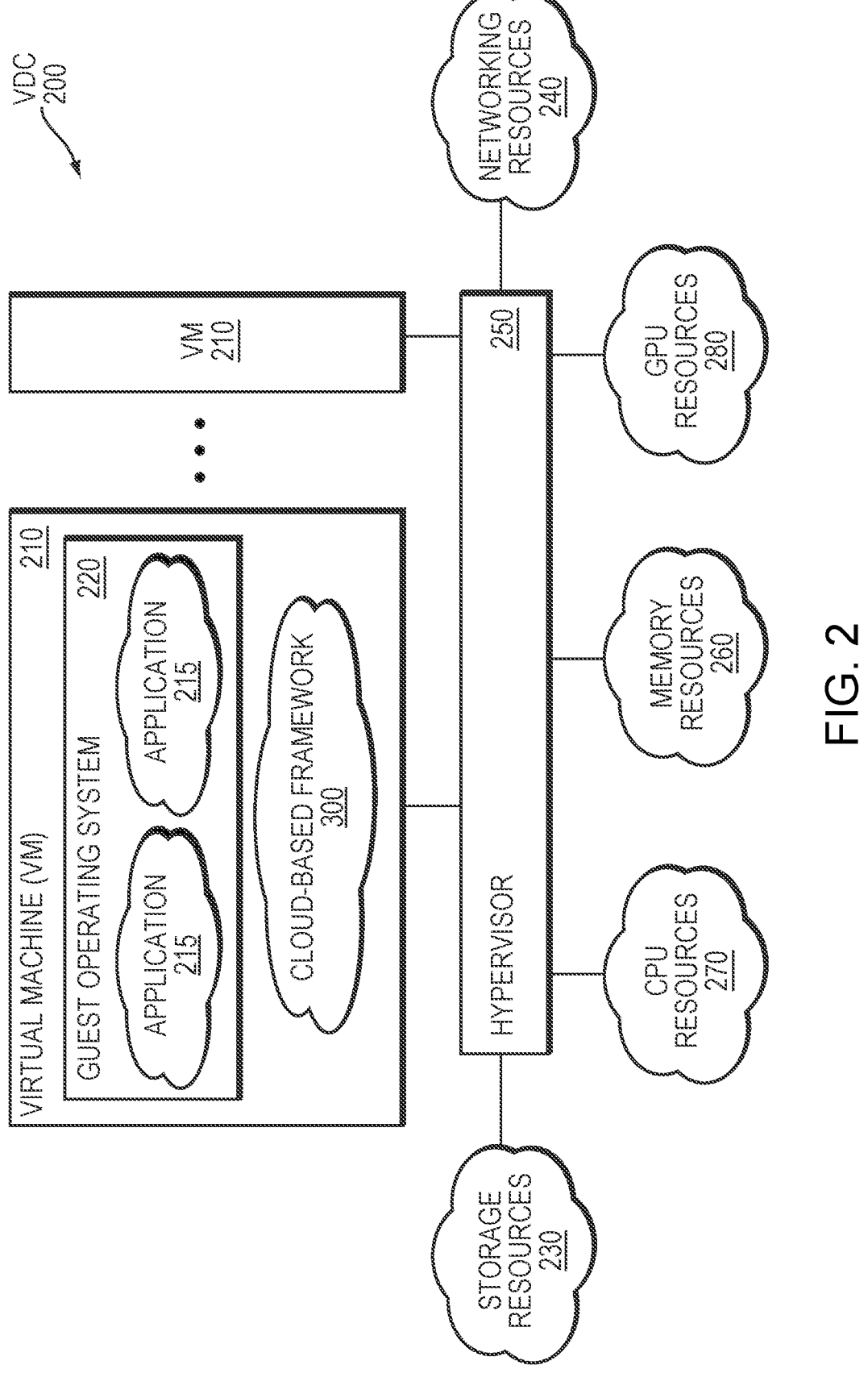
FIG. 2 is a schematic block diagram of a virtual data center.

FIG. 2 is a schematic block diagram of a virtual data center (VDC) 200 including one or more virtual machines (VMs) 210. Each VM 210 is managed by a hardware abstraction layer, e.g., a hypervisor 250, which is a virtualization platform configured to mask low-level hardware operations from one or more guest operating systems executing in the VM 210. In an embodiment, the hypervisor 250 is illustratively the Xen hypervisor, although other types of hypervisors, such as the Hyper-V hypervisor and/or VMware ESXI hypervisor, may be used in accordance with the embodiments described herein. A guest operating system (OS) 220 and applications 215, such as physical simulation software (e.g., physics solver code), may run in the VM 210 and may be configured to utilize hardware resources of the VDC 200 that are virtualized by the hypervisor 250. The guest OS 220 may be the Linux operating system, FreeBSD and similar operating systems; however, it should be noted that other types of guest OSs, such as the Microsoft Windows operating system, may be used in accordance with the embodiments described herein. The guest OS 220 and applications 215 may be managed, at least in part, by a cloud-based framework 300 configured to extend the virtualization and cloud-computing capabilities of VDC 200, including the utilization of virtualized resources.

As noted, the virtualized resources of the virtualized computing environment include storage, networking, memory, and/or processor resources. In an embodiment, the VDC 200 may organize the resources as pools of virtualized resources. For example, the VDC 200 may organize the virtualized resources as pools of virtualized storage (e.g., HDD and/or SSD) resources 230, networking (e.g., NIC) resources 240, memory (e.g., random access memory) resources 260, and processor resources, such as pools of general-purpose processing resources and specialized processing resources. The pool of general-purpose processing resources may be embodied as a pool of CPUs 270 and the pool of specialized processing resources may be embodied as accelerators, such as TPUs or, illustratively, a pool of GPUs 280. These pools of resources may be organized and distributed among the compute nodes 120 of the VDC 200.

Figure 3:
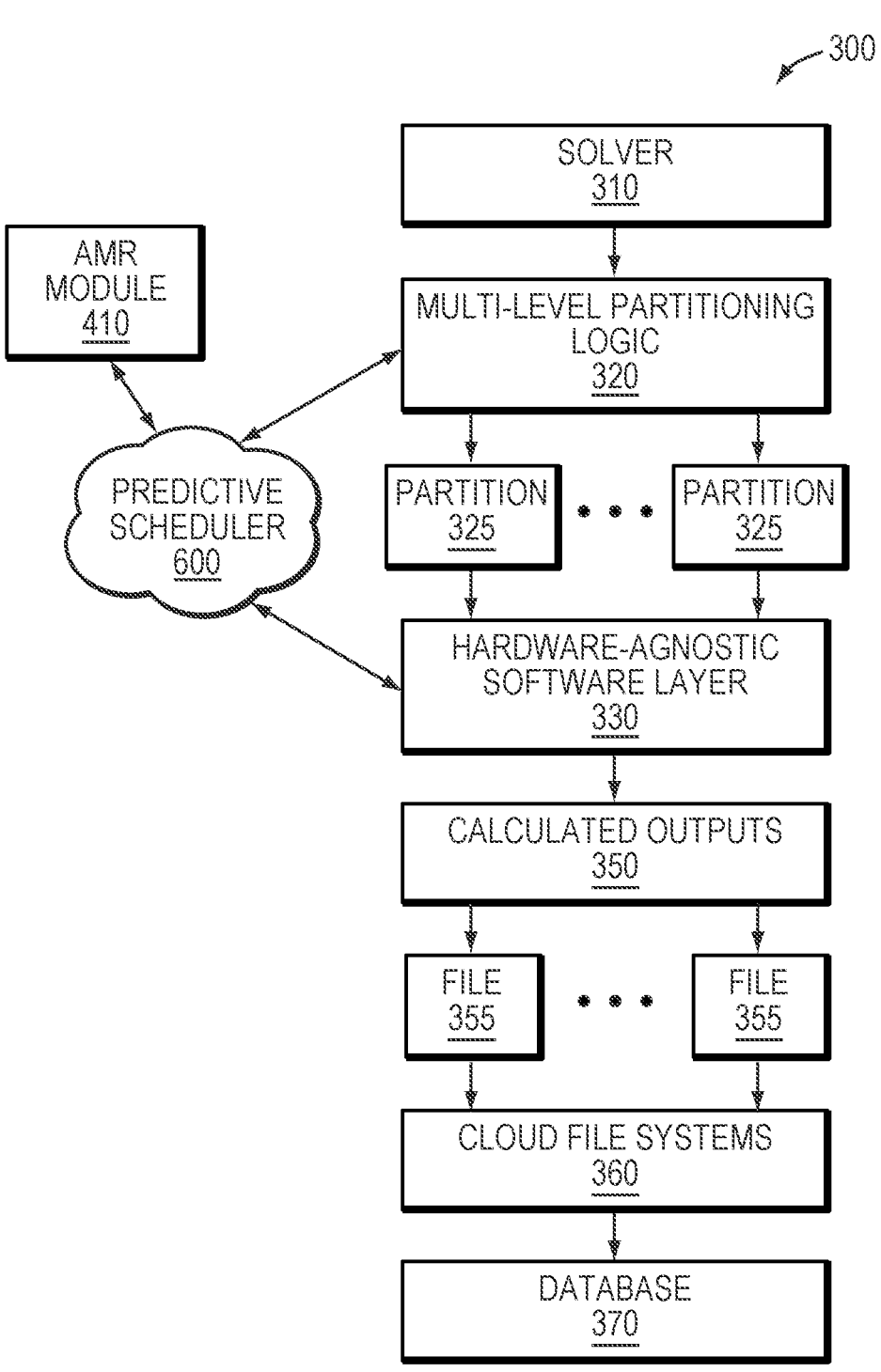
FIG. 3 is a schematic block diagram of a cloud-based framework.

The embodiments described herein are directed to a technique that manages specialized processing resources, e.g., graphics processing units (GPUs), as well as associated algorithm advancements to improve (i.e., reduce) and effectively mask (hide) computational costs of adaptive mesh refinement (AMR) from execution of a physical simulation solver on the GPUs. To that end, the technique includes the cloud-based framework configured to dynamically utilize a distributed pool of the GPUs to parallelize processing (e.g., computations) of physical simulation software (e.g., computational fluid dynamics solver code or, more generally, physics solver code as well as AMR/meshing) partitioned across multiple GPUs. FIG. 3 is a schematic block diagram of the cloud-based framework 300. An input data set (e.g., a mesh) of the physics solver code (solver 310) may be partitioned, e.g., via multi-level partitioning logic 320, into simulation kernels having one or more partitions 325 (i.e., code groups) that are configured to run on the GPUs 280. As used herein, simulation kernels are compute-intensive portions of the solver 310 that perform some operation(s) on a partition of an input computational data set (e.g., a mesh). Specifically, the multi-partitioning logic 320 may be configured to partition the mesh into subsets of a domain (code groups) that are each assigned to a single GPU 280. As described further herein, a predictive scheduler 600 interacts with an AMR module 410 and the solver 310 (via the multi-level partitioning logic 320) to locate, reserve, dynamically access, and thereafter release the GPUs needed for running the code groups. The framework 300 is configured to efficiently use bandwidth/compute capacity of the GPUs 280 for solver calculated outputs 350 asynchronously (via a hardware agnostic layer 330) and in cooperation with CPUs 270 as needed and on user demand. The results from the solver calculated outputs 350 are written as files 355 to cloud file systems 360. The files may include substantial amounts of data, which may be indexed and organized as output data sets that are, in turn, persistently and asynchronously stored as a query-able database 370. Illustratively, the database 370 may be presented as an analyzer configured to provide "instant analysis" using text-based queries of a calculated physical simulation result.

The technique described herein leverages the highly parallelized and distributed architecture of the framework 300 to provide a hybrid approach that operates partly on GPUs 280, e.g., to perform the physics solver code computations, and partly on CPUs 270 to accelerate portions of AMR and mesh processing, e.g., of the AMR module 410. However, in an illustrative embodiment, the technique further leverages the GPUs 280 to perform as much of the AMR module processing (e.g., algorithms that rely on fixed topology) that can be naturally and efficiently implemented on the GPUs, while maintaining those portions of processing that do not naturally map onto GPUs (e.g., algorithms with dynamic topology changes) on CPUs 270. Indeed, if the overall time to solution may improve, the technique may implement additional portions of the algorithms with dynamic topology changes on the GPUs even if such algorithms are not natural choices for execution on the GPUs. AMR module processing that may be performed on GPUs includes, e.g., error estimates, metric and mesh smoothing, solution interpolation, and even portions of actual mesh adaptation. The technique thus improves AMR processing to enable dynamic (on-the-fly) mesh adaptation and refinement asynchronously as the physics solver code executes by fully and tightly integrating the CPU and GPU resources with the AMR module and physics solver code execution, while also orchestrating data transfers to reduce costs of AMR processing.

Hybrid Approach Using GPU-CPU

Figure 4:
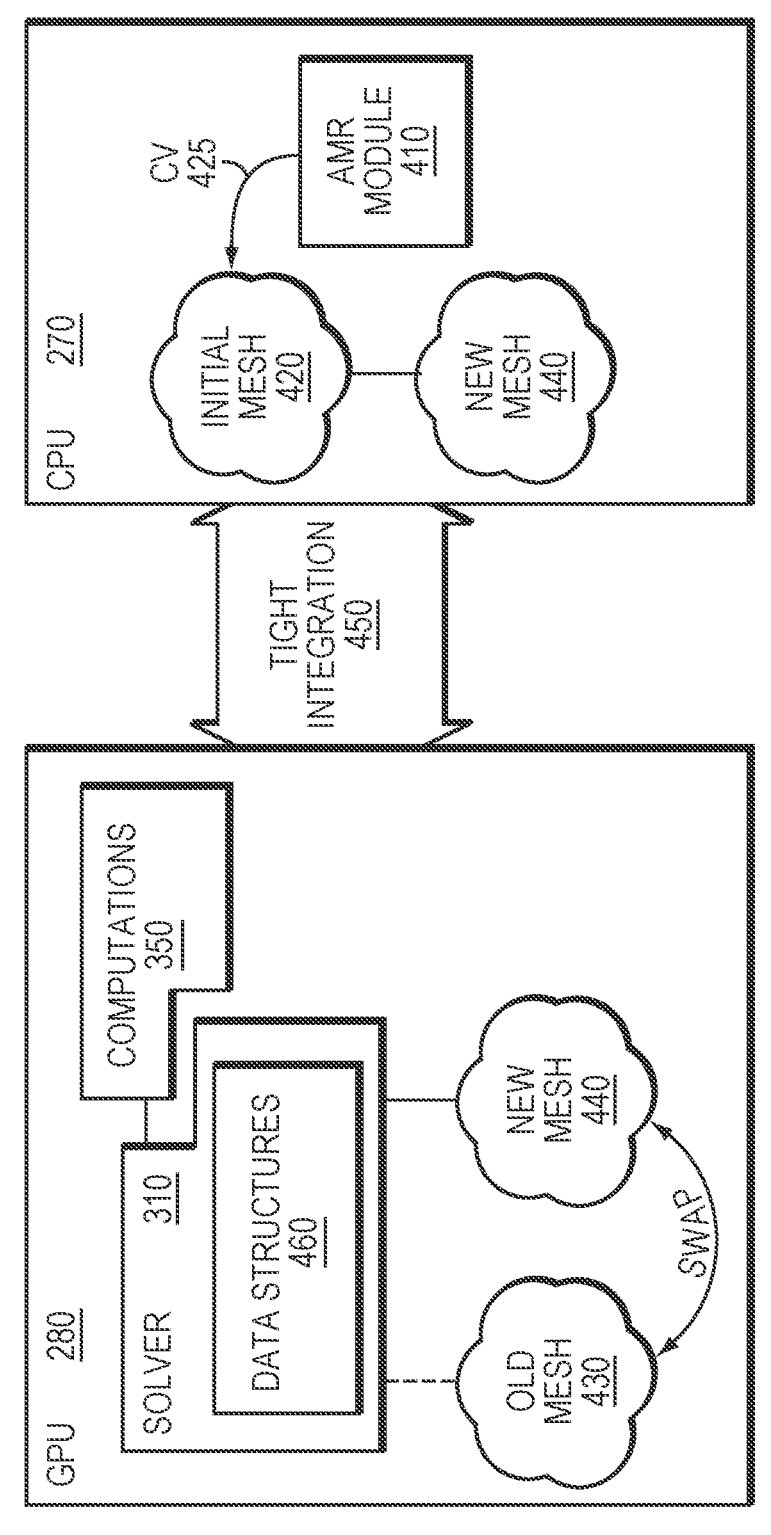
FIG. 4 is a schematic block diagram of a hybrid GPU-CPU approach for mesh generation and adaptive mesh refinement (AMR)

FIG. 4 is a schematic block diagram of the hybrid GPU-CPU approach 400 for mesh generation and adaptive mesh refinement (AMR). The hybrid approach operates partly on GPU 280, e.g., to perform the physics solver code computations, and partly on CPU 270 to accelerate portions of AMR and mesh processing, e.g., of an AMR module 410 in cooperation with the physics solver code (solver 310) to essentially hide some of the computational costs of AMR using CPU resources that may otherwise be idle as GPU computations continue. According to the technique, AMR processing is implemented asynchronously and simultaneously on CPU and GPU resources using an initial mesh 420 (e.g., illustratively created using mesh generation software capability on CPU 270) that is provided to the GPU 280 to initiate computation of the solver 310. As the computation executes on the GPU and features of a partial solution begin to appear, areas of the mesh that require refinement are computed as one or more error metrics containing, e.g., information as to where to add/subtract control volumes (CVs) to obtain a desired level of accuracy in the computation of the solver 310. The GPU 280 then sends the error metric to the CPU 270 while the solver 310 continues improving the solution on the old (previously initial) mesh 430. Using the error metric, the AMR module 410 executing on the CPU generates a new mesh 440, e.g., by adding/subtracting CVs 425 to the initial mesh 420. Once the new mesh 440 is refined according to the error metric, the CPUs send the new mesh to the solver 310, which (i) "swaps" (replaces) the old mesh 430 for the new mesh 440, (ii) interpolates (pushes) its latest improved (new) solution onto the new mesh 440 and (iii) continues to execute. Note that, in an embodiment, the tight integration 450 of CPU and GPU resources may further improve overall performance (i.e., reduce execution time of the physical simulation) by apportioning certain tasks of AMR mesh adaptation for execution on GPUs 280 while enabling direct access to data structures 460 of the solver 310 for portions of AMR and mesh processing on CPUs 270. The framework 300 facilitates performance of the computations (e.g., AMR mesh refinement and solver execution) concurrently, e.g., by employing what may otherwise be idle CPUs/GPUs, which require tight (and full) integration 450 between CPU 270 and GPU 280.

Notably, the tight (and extensive) integration between the CPU (i.e., AMR module execution) and GPU (i.e., solver execution) is realized through asynchronous cooperation of the AMR mesh adaptation with simultaneous execution of the solver computations without any I/O interruption. Such tight integration 450 allows a mesh to be initially generated and refined (e.g., based on a numerical solution that is not the latest solution) and subsequently improved to obtain a better solution that eventually converges to a final, accurate solution without stopping the solver computations. Iteration may involve determining where the solution needs greater (or lesser) resolution and, in response, adding (or decreasing) CV resolution 425 (i.e., increasing or decreasing resolution as appropriate) into the AMR mesh processing.

For instance, the technique eliminates a requirement (of prior implementations) of dumping/writing to a file 355 with its concomitant data structures to serialize the data needed for file I/O and, instead, updates the solver 310 with the latest, new mesh 440 without any need for data manipulation merely to accommodate transfer of updates to the solver. In an embodiment, the asynchronous computation of the numerical solution by the solver 310 using an old mesh 430 continues on the GPU 280 while the CPU 270 begins adaptation processing of a new mesh 440 (possibly using some GPU resources). Once the new mesh is provided to the GPU 280, the old mesh 430 is quickly swapped/replaced by the new mesh 440 to minimize solver downtime. During a next iteration of AMR processing, the CPU 270 receives newer, current information (e.g., via the error metrics) from the solver 310 execution for generation of the newer, improved resolution mesh. In other words, the technique enables continuous running of the solver 310 on GPU 280 while using available CPU resources 270 to perform AMR mesh processing and, when appropriate, push the new mesh 440 to the GPU 280, interpolate the latest solution onto the mesh 440, and continue computation. This novel aspect of the technique masks the computational cost of AMR module processing by avoiding delay or interruption of the solver.

In an embodiment, execution of the AMR module 410 is configured to lag execution of the solver 310 so that a new adapted mesh 440 is generated on the CPU 270 while the computation using a previous old mesh 430 (and solution) continues to run effectively concurrently on the GPU 280. Lagging of AMR mesh processing with respect to solver code processing ensures that execution of the solver 310 and AMR module 410 proceeds simultaneously without interruption. To that end, the AMR module processing further includes examination of the data structures 460 associated with the current solution of the solver 310 executing on the GPU 280 to enable the CPU 270 to quickly adjust (i.e., in real-time) its AMR processing based on the current solution. In this manner, frequent but small amounts of AMR module processing avoid falling too far behind the progress/state of the current solution. That is, the tight integration 450 between the GPU and CPU resources allows the AMR processing to incrementally update the solver 310 (e.g., with an adapted mesh) to reduce the cost of falling too far behind the solution. In addition to the lag, the AMR mesh adaptation and solver processing may be tuned to advance at intervals in "lock-step" with the solver (i.e., synchronized intervals to operate at substantially the same time as the solver) where the mesh adaptation provides frequent updates to the solver 310 to perform additional work to continue the simulation. For example, instead of computing for one hundred (100) time steps before refining the mesh, the AMR mesh adaptation and solver processing can work essentially in lock step with small amounts of mesh updates to maintain solid communication between CPU and GPU.

In an embodiment, the technique interpolates the latest solution that exists in the GPU 280 immediately after the new mesh 440 is generated and loaded onto the GPU 280. When the new mesh 440 is ready, the latest numerical solution on the GPUs 280 is interpolated onto the new mesh 440 and the computation proceeds on the GPUs. The tight integration 450 (synchronization) of resources obviates interruption of the solver code execution and allows tasks of the AMR module 410 to proceed simultaneously. That is, once the GPU-CPU combination determines an error estimate and begins to generate a refined/adapted (new) mesh 440, the solver code continues executing on the existing mesh while the AMR module 410 executes to generate a newer refined mesh. In this manner, mesh refinement may be performed (largely) concurrently with solver execution. Execution of the solver 310 on GPUs 280 then proceeds from the new solution interpolated onto the new mesh asynchronously and fully integrated with the AMR module execution on CPUs 270 to increase utilization of processing resources and, thus, effectively decrease an overall cost of simulation as well total time of the simulation.

In an embodiment, the solver employs a dual approach for characterizing meshes, where a specific simplified mesh representation (e.g., a description having a reduced number of faces for each CV) is used in the AMR module 410, and a fully "dual" mesh is used for the solver 310. In this manner, the AMR mesh can more efficiently accommodate changes in mesh topology, whereas the more complicated solver mesh reduces the number of elements and is, thus, more efficient for static computation on each new version of the mesh. Notably, this scheme relies on minimal data exchange between the solver and AMR module, wherein only error metrics computed from the physical simulation are transferred from the solver 310 to the AMR module 410 and wherein the AMR module in turn sends updated CVs (e.g., with or without the new mesh) back to the solver.

Figure 5:
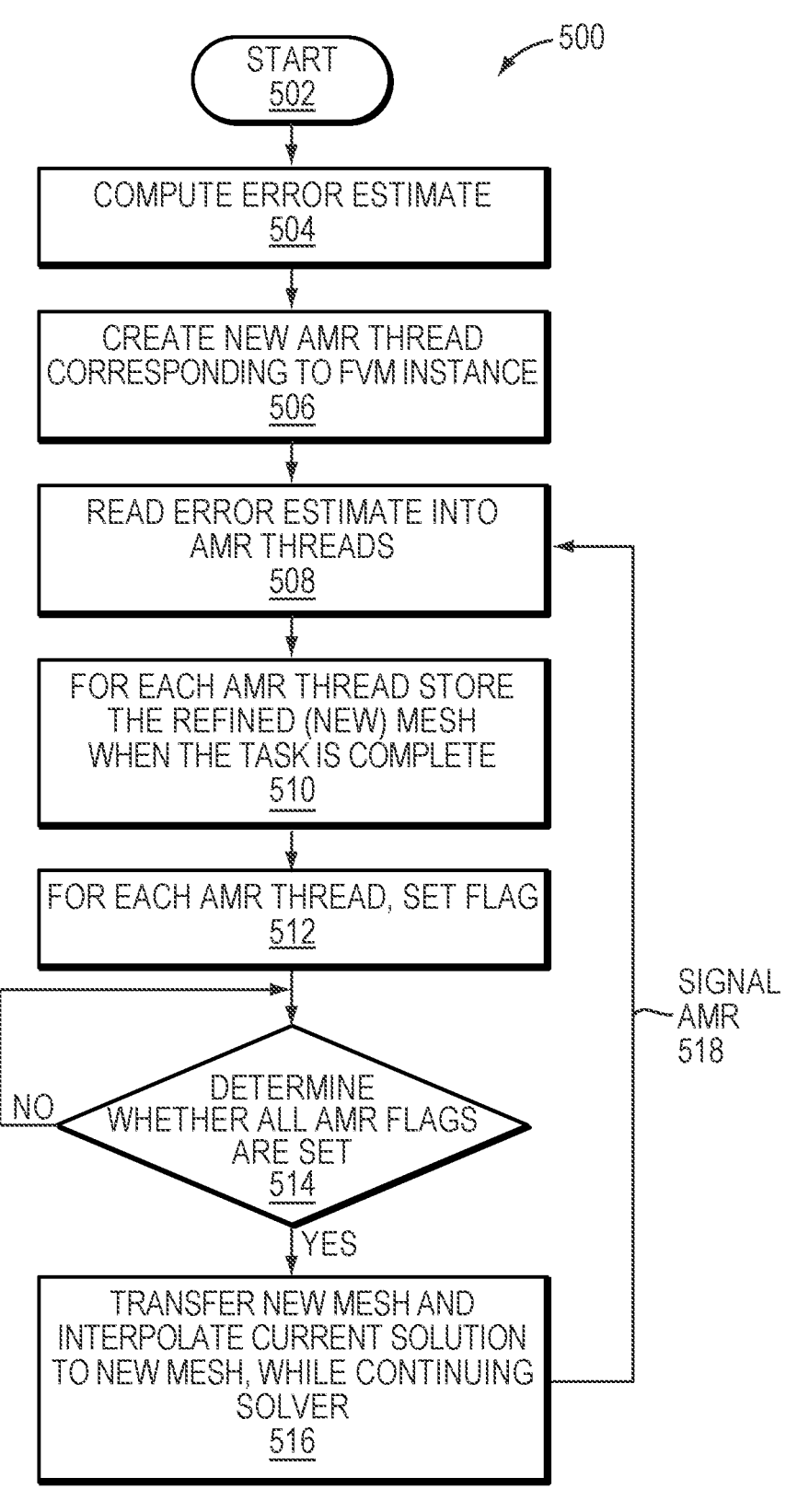
FIG. 5 is a flowchart of AMR processing applied to a solver.

FIG. 5 is a flowchart of AMR processing applied to a Finite Volume Solver (FVS or, more generally, solver). In an embodiment, a parallel computation communication mechanism, such as Message Passing Interface (MPI), may be used to organize execution of the solver 310 on the GPUs 280 and provide a wide range of communication and synchronization functions needed for concurrent execution. The procedure begins at step 502 and proceeds to step 504 where an error estimate from the solver is computed on one or more of the GPUs. A new task (e.g., thread) of the AMR module corresponding to each instance of the solver is created at step 506 (e.g., a thread corresponding to each MPI rank of the solver code). The error estimate is then read by the AMR threads (tasks) for processing in step 508. In another embodiment, the error estimate may be read back to the CPUs from GPUs when the AMR tasks are executed on the CPUs. As such, the AMR module runs effectively as a separate process able to use all MPI ranks until complete. For example, if using GPUs, work is submitted to the same queues as used by the solver or, if using the CPUs, the AMR module uses resources not in contention from the solver, as the CPUs are mostly idle.

At step 510 each rank of the AMR thread stores the refined (new) mesh in memory when the task is complete. In this manner, the solver of a same rank as the AMR thread may access the memory to obtain the new mesh without contention. At step 512 each AMR thread sets a flag (e.g., boolean value having a sentinel value TRUE) in memory to signal completion and blocks (waits) until a new error estimate is available from the solver to process mesh refinement.

At step 514, a determination is made whether all the AMR threads are complete for continuing the calculation as indicated by all AMR flags being set (e.g., when all the AMR booleans ANDed together are TRUE; alternatively, when a global counter reaches a threshold/zero as each AMR flag that is set increments/decrements the global counter). At step 516 when all AMR threads are ready, the AMR module transfers the new mesh to the solver, which interpolates the current solution to the new mesh while continuing solver execution (updating solver settings as needed) and proceeds until ready to signal AMR (could signal immediately, or after some degree of convergence) at step 518.

Predictive Scheduler

In an embodiment, the technique is configured to allocate GPU and CPU resources commensurate with the physical simulation computations expected for various stages of the AMR processing as demand changes. For example, it is cost effective to allocate only those resources as needed so that at an initial stage (start) of a simulation, allocated resources may be a small subset of the entire amount of resources needed at the end (last stage) of the simulation. Accordingly, the technique includes use of the predictive scheduler 600 configured to locate and predictively reserve the resources within the VDC that are available in their respective distributed pools, dynamically access and utilize those resources from the pools when needed, and then promptly release the resources upon completion of the calculations when anticipated demand falls. Illustratively, the scheduler 600 may reserve and allocate the GPU and CPU resources commensurate with the physical simulation calculations required for various stages of the AMR processing before they are needed, but within an expected window of time, measure geographic distances (i.e., determining latency) of the resources (e.g., on which the software executes) relative to each other, dynamically access and utilize available resources for AMR task execution (e.g., based on the measured distances) as the mesh adapts (e.g., grows) during the simulation, and then promptly release the GPUs upon completion of the simulation.

Figure 6:
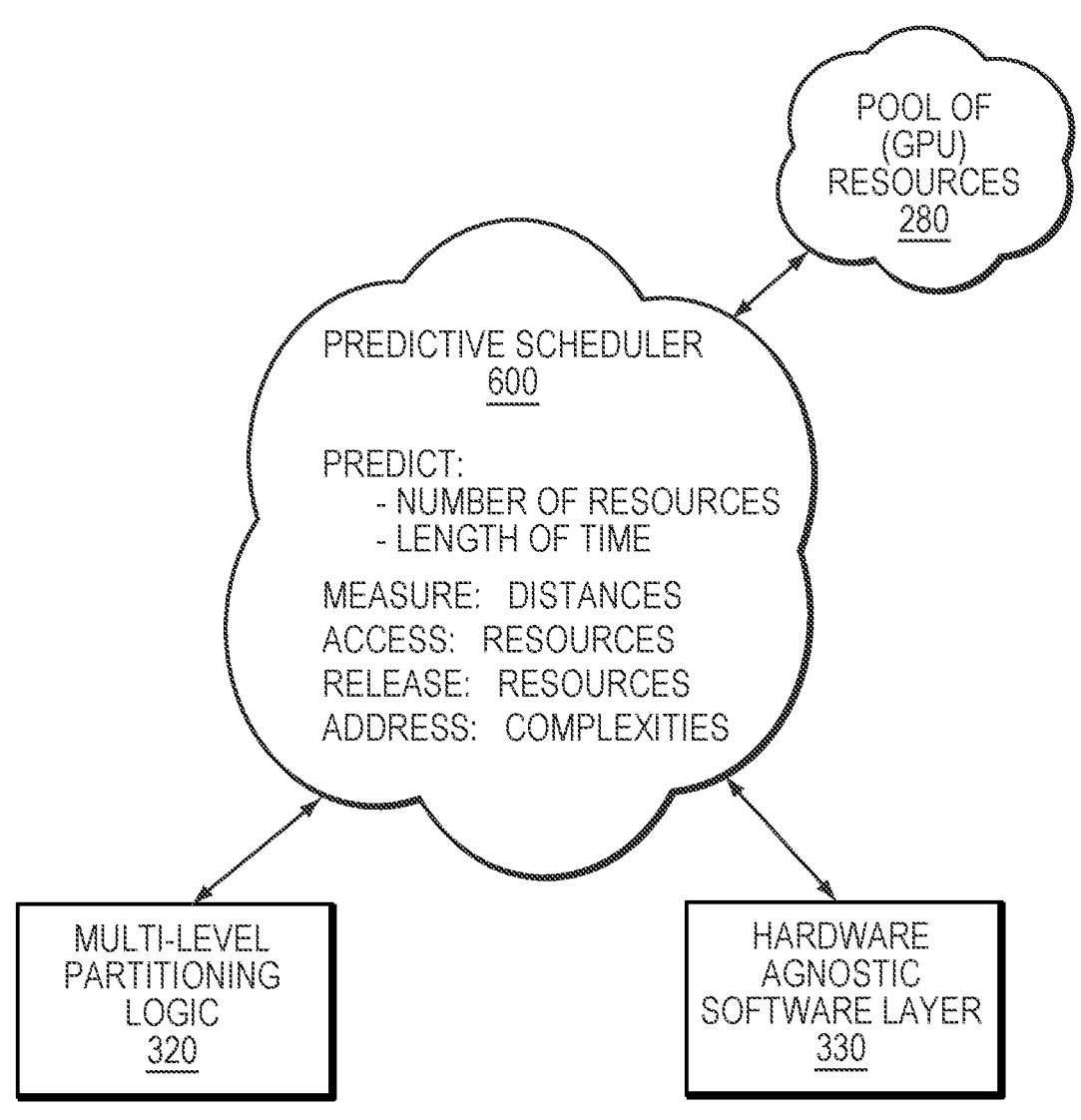
FIG. 6 is a schematic block diagram of a predictive scheduler of the cloud-based framework.

FIG. 6 is a schematic block diagram of the predictive scheduler 600 of the cloud-based framework 300. In an embodiment, the predictive scheduler 600 may interact with the AMR module 410 and solver 310 (e.g., via multi-level partitioning logic 320) to locate, reserve, dynamically access, and thereafter release GPUs 280 needed for running the module 410 and solver 310 (e.g., simulation kernels and partitions 325). For example, the scheduler 600 may interact with the AMR module 410 and solver 310 to predict the number of compute (e.g., GPU) resources needed as well as how long (length of time) those resources are needed based on past performance using, e.g., machine learning algorithms influenced by user actions and preferences. Error estimates determined during AMR module processing can be used to ascertain a size of the mesh (e.g., a number of CVs) needed for the various stages. The predictive scheduler 600 may determine the number of GPUs 280 currently allocated to the simulation and, if needed, the number of GPUs that may be dynamically acquired from other simulations that may be completing (and thus will relinquish those resources).

The scheduler 600 may also interact with the pool of GPU resources 280 of the VDC 200 to locate the GPUs before they are needed within an expected window of time. The VDC 200 may include various geographically dispersed regions with available GPU resources 280 that may be accessed within those regions. The predictive scheduler 600 may measure the geographic distances (i.e., determining latency) between the GPU locations (e.g., at which the software executes) relative to each other, dynamically access and utilize available GPUs for AMR module and solver (kernel) execution (e.g., based on the measured distances), and then promptly release the GPUs, if necessary, back to the pool of GPU resources 280 upon completion of the execution.

Notably, the GPUs are initialized (booted) upon access, which may require a period of time as long as 5-6 minutes during which the GPU resources 280 are unavailable for use, e.g., by an intended user's simulation, thereby resulting in wasted bandwidth and cost. To obviate such waste, the scheduler 600 may leverage machine learning algorithms to perform speculative scheduling to predict when GPU resources utilized by another user's simulation may be released and become available. If appropriate, the scheduler 600 may not release those GPU resources once the other user's simulation completes, but rather may hold the resources so that they may be applied immediately (i.e., immediately available) to the intended user's simulation as an effective resource release delay. This aspect of the technique involves configuring the predictive scheduler 600 to pool the GPU (and CPU) resources globally across different simulations to maximize total utilization. That is, GPU resource management may be predictively biased by user according to anticipated near-term use based on prior behavior.

Minimal Data Transfer

Figure 7:
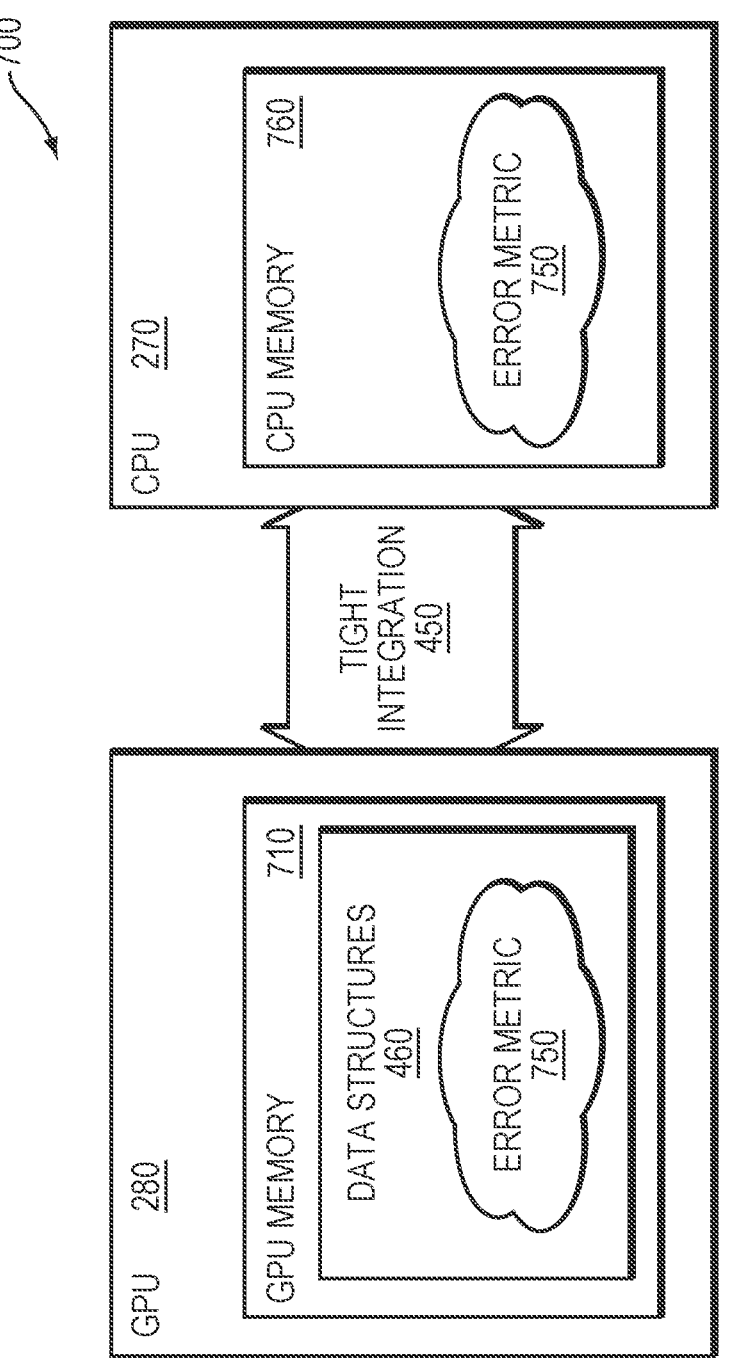
FIG. 7 is a schematic block diagram of a data transfer arrangement including reused data structures.

The technique also provides a level of optimization in data transfer efficiency between the GPU and CPU through the use of adaptively changing (i.e., reused) data structures. FIG. 7 is a schematic block diagram of a data transfer arrangement 700 including reused data structures 460. During solver code execution, contents of the data structures 460 are organized in GPU memory 710 in a format that exposes the GPU memory 710 to CPU 270 and enables asynchronous, non-intrusive CPU access to portions of the contents used for dynamic mesh adaptation in a safe manner and without impeding solver code execution on the GPU 280. Such non-intrusive access reduces the number of copies of data stored in CPU memory 760, while advantageously providing a substantial performance improvement by minimizing movement of data between the GPU 280 and CPU 270.

In an embodiment, the tight integration 450 of GPU and CPU enables reuse of the data structures 460 directly, e.g., instead of transforming, recreating, or reconstructing the data structures, which eliminates excessive duplication of data in CPU memory 760. Prior data structures used in prior implementations have required reconstruction for use with AMR processing. In accordance with the technique, reused data structures 460 (e.g., error estimates, mesh metric gradations, etc.) may assume a memory format that is compatible for both solver (FVS) and AMR module processing, thereby obviating the need for memory reformatting or recreation. For example, by maintaining a version of a mesh data structure suitable for fast refinement between adaptation iterations, the data needed to be communicated from solver 310 to AMR module 410 is reduced to just the error metric. Once the GPU (i.e., solver execution) signals to the CPU (i.e., AMR module execution) that data is ready, the CPU 270 can safely asynchronously copy the new error metric information 750 while solver 310 continues concurrently unabated.

Note that there may be situations where use of compatible data structures 460 in both GPU memory and CPU memory allows exchange of pointers without reformatting of the memory, transferring of memory data, or maintaining multiple copies of the data. This compatible use of the reused data structures 460 manifests as an advantage that ensures the GPU 280 is constantly running to continue solver execution. The technique accommodates various types of simulations, including steady-state and transient simulations, while enabling flexibility with respect to CPU and GPU processing to optimize the AMR process.

Since interpolation of the solution is performed on the GPUs before continuing to run on the new mesh, the amount of data that is transmitted between the CPU (AMR module 410) and GPU (solver 310) is minimal, thereby reducing the amount of data transfer. Interpolation weights may be used as a memory efficient way of communicating how to interpolate the solution from the old mesh 430 to the new mesh 440. Significantly less data is transferred than if entire post-interpolated solutions as a whole are transferred directly. Effective reduction in such data communication transfer requires use of an entirely GPU-native solver 310 not requiring any CPU-based components for computation, which is not common in previous implementations.

Advantageously, the hybrid approach of the technique enables adaptive refinement of meshes generated on CPUs while the solver executes on GPUs. In other words, the technique adaptively changes the mesh while the solver executes using the error estimates during stages of the AMR processing computations to determine the size of mesh needed in its next instantiation. The predictive scheduler of the technique is configured to allocate GPU and CPU resources commensurate with the physical simulation computations expected for various stages of the AMR processing. The technique enables full and tight integration of the CPU and GPU resources with the solver such that the solver code is constantly executing. Moreover, the technique ensures execution of the AMR module lags execution of the solver so that immediately after a new mesh is generated, the latest solution as generated by the CPU-GPU combination may be interpolated onto the new mesh. Such lagging obviates the need to stop the solver execution and, thus, allows AMR "task" processing to proceed simultaneously. In addition, the technique also provides a level of optimization in data transfer efficiency between the GPU and CPU through the use of adaptively changing data structures.

While there have been shown and described illustrative embodiments of a technique that manages specialized processing resources as well as associated algorithm advancements to improve and effectively hide computational costs of AMR processing, it is to be understood that various other adaptations and modifications may be made within the spirit and scope of the embodiments herein. For example, embodiments have been shown and described herein with relation to use of the latest AMR process solution for adaptive mesh refinement and interpolation. However, the embodiments in their broader sense are not so limited, and may, in fact, allow for use of the latest solution of the solver for other aspects of the AMR process before arriving at the adaptive mesh and, ultimately, interpolation. These aspects may utilize timestamp data for various optimizations. Essentially, interpolation is the point at which synchronization between the CPU-GPU occurs; therefore, the technique ensures interpolation is performed as fast as possible to minimize data transfer.

The foregoing description has been directed to specific embodiments. It will be apparent however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on hardware resources, the program instructions configured to:

execute a physical simulation solver (solver) partitioned for concurrent execution on specialized accelerator resources (accelerators) of the hardware resources provided by a data center, wherein the solver uses a mesh to compute a solution;

read an error estimate of the solution into a general-purpose processor resource (processor) of the hardware resources coupled to the accelerators;

compute a refined mesh for the solver on the processor using the error estimate, wherein computation of the refined mesh on the processor is performed concurrently with execution of the solver on the accelerators using the mesh;

replace the mesh with the refined mesh such that replacement of the mesh with the refined mesh occurs at intervals in lock step synchronized with execution of the solver; and continue concurrent execution of the solver on the accelerators using the refined mesh.

2. The non-transitory computer readable medium of claim 1, wherein the program instructions for execution on the hardware resources configured to compute the refined mesh are further configured to increase a resolution of a control volume of the mesh used by the solver.

3. The non-transitory computer readable medium of claim 1, wherein the program instructions for execution on the hardware resources are further configured to incrementally update the mesh to form the refined mesh and push the refined mesh to the accelerators.

4. The non-transitory computer readable medium of claim 1, wherein the program instructions for execution on the hardware resources configured to compute the refined mesh are further configured to employ a simplified mesh representation having a reduced number of faces for each control volume during refinement of the mesh and wherein the refined mesh used by the solver is a dual mesh having a greater number of faces for each control volume than the simplified mesh representation.

5. The non-transitory computer readable medium of claim 1, wherein the program instructions for execution on the hardware resources configured to compute the refined mesh are further configured to create one or more threads for the mesh refinement to execute on the accelerators corresponding to the concurrent execution of the solver.

6. The non-transitory computer readable medium of claim 5, wherein the program instructions for execution on the hardware resources configured to compute the refined mesh are further configured to, for each mesh refinement thread, store the refined mesh in a same rank as the corresponding concurrent execution of the solver.

7. The non-transitory computer readable medium of claim 5, wherein the program instructions for execution on the hardware resources configured to create one or more threads for the mesh refinement to execute on the accelerators are further configured to set a corresponding flag in each thread.

8. The non-transitory computer readable medium of claim 7, wherein the program instructions for execution on the hardware resources configured to replace the mesh with the refined mesh are further configured to signal the read of another error estimate when the flags of the mesh refinement threads are all set.

9. The non-transitory computer readable medium of claim 1, wherein the program instructions for execution on the hardware resources configured to continue concurrent execution of the solver are further configured to:

interpolate the solution onto the refined mesh; and continue concurrent execution of the solver on the accelerators using the refined mesh.

10. The non-transitory computer readable medium of claim 1, wherein the program instructions for execution on the hardware resources configured to compute the refined mesh are further configured to increase resolution of a plurality of control volumes of the mesh used by the solver.

11. A method comprising:

executing a physical simulation solver (solver) partitioned for concurrent execution on specialized accelerator resources (accelerators) provided by a data center, wherein the solver uses a mesh to compute a solution;

reading an error estimate of the solution into a general-purpose processor resource (processor) provided by the data center and coupled to the accelerators;

computing a refined mesh for the solver on the processor using the error estimate, wherein computation of the refined mesh on the processor is performed concurrently with execution of the solver on the accelerators using the mesh;

replacing the mesh with the refined mesh such that replacement of the mesh with the refined mesh occurs at intervals in lock step synchronized with execution of the solver; and continuing concurrent execution of the solver on the accelerators using the refined mesh.

12. The method of claim 11, wherein computing the refined mesh further comprises increasing a resolution of a control volume of the mesh used by the solver.

13. The method of claim 11, wherein computing the refined mesh further comprises increasing resolution of a plurality of control volumes of the mesh used by the solver.

14. The method of claim 13, wherein computing the refined mesh further comprises employing a simplified mesh representation having a reduced number of faces for each control volume during refinement of the mesh and wherein the refined mesh used by the solver is a dual mesh having a greater number of faces for each control volume than the simplified mesh representation.

15. The method of claim 11, further comprising incrementally updating the mesh to form the refined mesh and pushing the refined mesh to the accelerators.

16. The method of claim 11, wherein computing the refined mesh further comprises creating one or more threads for the mesh refinement to execute on the accelerators corresponding to the concurrent execution of the solver.

17. The method of claim 11, wherein continuing concurrent execution of the solver further comprises:

interpolating the solution onto the refined mesh; and continuing concurrent execution of the solver on the accelerators using the refined mesh.

18. A system comprising:

one or more compute nodes of a virtualized data center (VDC) having hardware resources configured to execute a cloud-based framework to, execute a physical simulation solver (solver) partitioned for concurrent execution on specialized accelerator resources (accelerators) of the hardware resources, wherein the solver uses a mesh to compute a solution;

read an error estimate of the solution into a general-purpose processor resource (processor) of the hardware resources coupled to the accelerators;

compute a refined mesh for the solver on the processor using the error estimate, wherein computation of the refined mesh on the processor is performed concurrently with execution of the solver on the accelerators using the mesh;

replace the mesh with the refined mesh such that replacement of the mesh with the refined mesh occurs at intervals in lock step synchronized with execution of the solver; and continue concurrent execution of the solver on the accelerators using the refined mesh.

* * * * *